Sept. 16, 1969  H. MOREINES  3,467,956

CROSSVOTER MONITOR SYSTEM

Filed Oct. 22, 1963  4 Sheets-Sheet 1

INVENTOR.
HAROLD MOREINES
BY
*Herbert L. Davis*
ATTORNEY

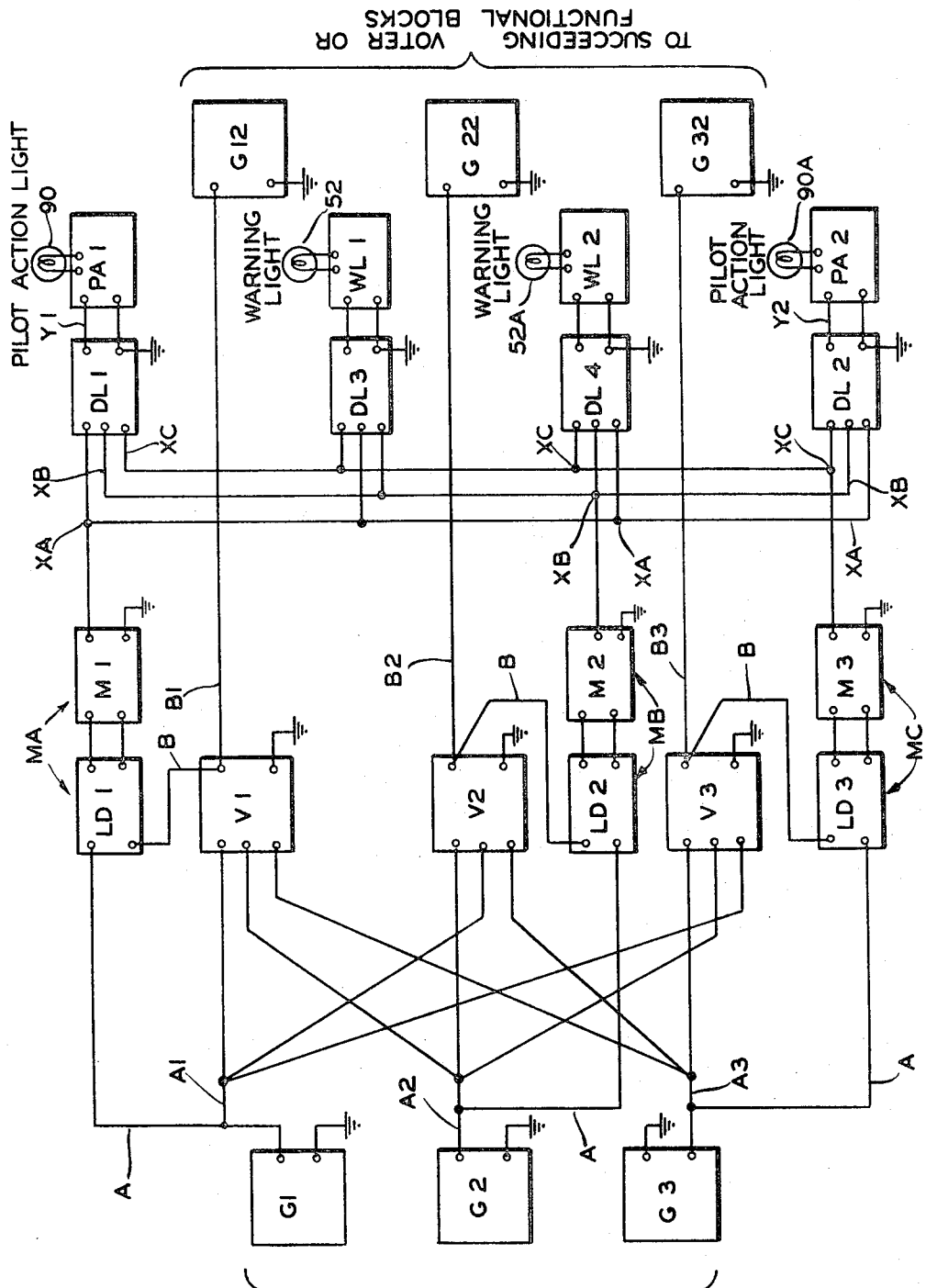

INVENTOR.
HAROLD MOREINES

INVENTOR.
HAROLD MOREINES

United States Patent Office 3,467,956
Patented Sept. 16, 1969

3,467,956
CROSSVOTER MONITOR SYSTEM
Harold Moreines, Springfield, N.J., assignor to The Bendix Corporation, Teterboro, N.J., a corporation of Delaware
Filed Oct. 22, 1963, Ser. No. 317,970
Int. Cl. G08b 21/00
U.S. Cl. 340—248
15 Claims

ABSTRACT OF THE DISCLOSURE

A crossvoter monitor system in which a plurality of voter devices each produce an output signal as a result of instantaneous differences in amplitude or phase of input signals and in which each input signal is compared in the monitor system differentially with an output signal from a voter device so that a narrow tolerance spread in the monitored differential voltage may be maintained during normal operation, since each input signal is compared against a median voter output signal which is a significant factor in minimizing the occurrence of nuisance disconnects due to normal tolerance spreads between functional elements in the redundant channels. Further while the monitor system includes memory means and means effective upon a change in any of said output signals for indicating an out of tolerance signal, there is provided additional means responsive to a change in said output signals, together with a two-out-of-three logic detector or means responsive to a change of state of a majority of the memory means for indicating the presence of more than one out of tolerance signal to provide a pilot action signal.

---

This invention relates to improvements in a monitoring system for use in redundant systems of a type disclosed and claimed in a copending U.S. application Ser. No. 314,397, filed Oct. 7, 1963, by Harold Moreines, and assigned to The Bendix Corporation, assignee of the present invention, now U.S. Patent No. 3,305,735, granted Feb. 21, 1967, and more particularly to a crossvoter monitor for use in conjunction with signal selection (voting) in redundant systems to monitor the performance of the system.

The need for ultra-reliable flight control systems and in particular the necessity for fail-operative performance during critical phases of flight has dictated the use of the triple redundant system implementation. Such implementation heretofore has consisted basically of comparison monitoring, wherein redundant signals have been compared on an amplitude basis and upon detection of a failed signal, manifested by a comparison error greater than a preset limit, the faulty signal is disconnected from the line by active switching elements. Such techniques have not proved entirely satisfactory as the failed signal must obtain a deviation equal to the preset limit before it is disconnected making it possible for a transient pulse equal to this limit to be transmitted. Also, if redundant channel separation is maintained throughout, the build up of signal tolerances through cascaded functional elements may become so large at the channel output points as to cause frequent nuisance disconnects, or in the alternative, to require that the tolerances on each functional element be extremely precise resulting in prohibitive cost.

In situations where the flight safety of high performance aircraft in critical flight conditions is dependent upon stability augmentation, redundancy is necessary to insure continued system operation in the presence of single faults. Such situations may arise, for example, in low-level, high speed tactical missions; in hovering and transitional flight of VITOL aircraft; or in the terminal phases of all-weather automatic landing.

Conventional flight control systems for stability augmentation are comprised of sensors, data processing elements, and actuators. This invention is concerned primarily with those portions of the system that generate, process, or operate from data in the form of electrical voltages or currents. The current state of the art in sensor and actuator mechanization is based almost completely upon analog data techniques. Until the technology of direct digital sensing and actuation reaches a greater degree of maturity and reliability than is presently exhibited the simplest and most straightforward stability augmentation system mechanization will employ analog data-processing.

Thus, any redundancy technique applied to the basic flight control system must be compatible with the various forms of analog data generally encountered in these systems.

The redundant system of the present invention employs a form of majority logic voting in which the control channels are triplicated and divided into functional groupings having suitable data interfaces. Majority voters are inserted into the "on-line" control system at these points.

The voter is a simple, passive network which continuously selects and transmits a signal having an intermediate amplitude among three input signals, i.e., ignores hardovers, null failures, degraded signals. This is accomplished with no active switching of signals or interruption of the signal transmission lines.

At the same time, the signals are monitored on an "off-line" basis to provide the necessary logic to determine and store the occurrence of malfunctions. This is accomplished in a manner which in no way interferes with or interrupts the control channels, and in fact, the monitor malfunction indication may be adjusted for whatever level or signal degradation or failure is determined to be outside of system performance requirements. This ensures that, in the event of minor changes in component characteristics, nuisance disconnects or warnings do not occur even through the resultant signal is in fact being rejected by the voter circuit. However, should this degradation worsen either on a long term or short term basis, the monitor circuit will indicate the presence of a malfunction when the degradation exceeds specification levels.

The choice of voter-monitor locations within the system can provide, as an immediate by-product, line replaceable unit (LRU) malfunction isolation since the location of voter-monitor ensembles is best accomplished at the input-output terminals of replaceable assemblies. It is also possible to utilize these techniques within the LRU assemblies to provide fault isolation at the quick disconnect subassembly level to further reduce and simplify maintenance operations. The off-line monitor is unique in that it possesses the following desirable features:

(1) Any failure to the monitor will not deteriorate the data signal.

(2) The monitor is capable of detecting failures due to shorts, opens, out of tolerance amplitudes and out of tolerance phase shifts.

(3) The monitor is fail-safe, that is, any failure to the monitor will be displayed as a system failure.

(4) Monitor outputs are normally at the supply voltage or high level so that any passive or power supply failure is also displayed as a system failure.

One means of off-line monitoring includes a cross channel monitor arrangement in which there is provided a two-by-two comparison of input signals as described and claimed in a copending U.S. application Ser. No. 318,050, filed Oct. 22, 1963, by Robert L. Worthington and Frank J. Thomas, now U.S. Patent No. 3,289,193, granted Nov. 29, 1966, and assigned to The Bendix Corporation, assignee of the present invention.

An object of the invention is to provide a novel crossvoter monitor arrangement in which each input signal to the monitor is compared with a voter output signal so as to provide a distinct advantage over the crosschannel monitor arrangement with respect to the tolerance spreads in the monitored signals.

Another object of the invention is to provide a novel crossvoter monitoring system in which the voter is replicated in each redundant channel so as to combine its failure probability with that of its associated functional element so that the system may survive a combined failure of any one functional element and its associated voter.

Another object of the invention is to provide a novel "crossvoter" monitor means affording a lower tolerance spread between monitoring points than does the cross channel monitoring means and novel means for minimizing the occurrence of nuisance disconnects due to normal tolerance spreads between functional elements in the redundant channels.

Another object of the invention is to provide a novel crossvoter monitor system including means for comparing each voter input signal against a median voter output signal so as to provide a narrower tolerance spread in the monitored differential voltage.

Another object of the invention is to provide a novel cross-voter monitoring means in which each voter input is compared differentially with the voter output.

Another object of the invention is to provide in a triplicated redundant system including redundant voters, novel crossvoter monitoring means in which each voter input may be associated with a particular voter output for comparison purposes.

The foregoing and other objects and advantages of the invention will appear more fully hereinafter from a consideration of the detailed description which follows, taken together with the accompanying drawings wherein several embodiments of the invention are illustrated by way of example. It is to be understood, however, that the drawings are for the purpose of illustration only and are not to be construed as defining the limits of the invention.

In the drawings:

FIGURE 2 is a block diagram of a crossvoter monitoring system in which the voter has been replicated in each redundant channel to combine its failure probability with that of its associated functional element.

Figure 1:
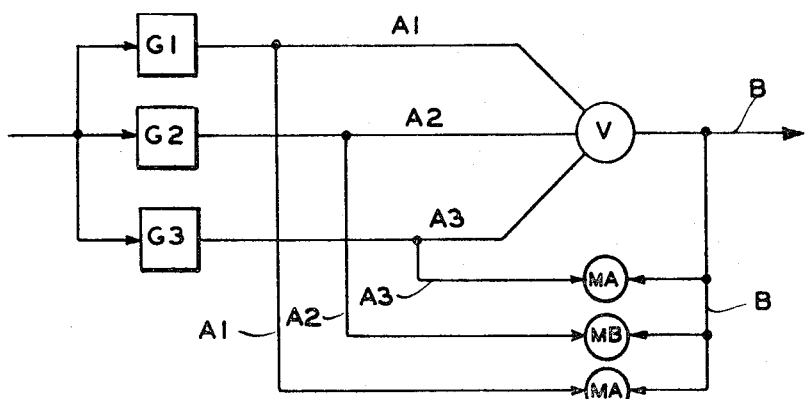
FIGURE 1 is a block diagram of a crossvoter monitoring system embodying the present invention.

Referring to the block diagram of FIGURE 1, there is shown an off-line crossvoter monitor arrangement having a triple redundancy system including a voter device V, as disclosed and claimed in the copending U.S. application Ser. No. 314,397, filed Oct. 7, 1963, by Harold Moreines, now U.S. Patent No. 3,305,735. The voter device V is a simple, passive network which selects and transmits a signal having an intermediate amplitude from among three input signals A1, A2, and A3 from the redundant equipment G1, G2, and G3 to an output line B leading to operated equipment as explained in the aforenoted U.S. Patent No. 3,305,735. This is accomplished with no active switching of signals or interruptions of the system transmission lines.

At the same time in the system of the present invention, the signals are monitored on an off-line basis by crossvoter monitor MA, MB, and MC to determine and store the currents of malfunction. This is accomplished in a manner which in no way interferes with or interrupts the input control channels A1, A2, and A3, or the output channel B, and in fact, the controlled malfunction indication may be adjusted for whatever level or signal degradations or failure is determined to be outside of system performance requirements. This insures that, in the event of minor changes in component characteristics of the redundant equipment G1, G2, and G3, nuisance degradations or warnings do not occur even though the resultant signals are in fact being rejected by the voter device V. However, should this degradation worsen either on a short-term or long-term basis, the control circuits MA, MB, and MC, would indicate a difference between the output signals B and the input signals on channels A1, A2, and A3 so that the monitor circuit would indicate the presence of a malfunction when the degradation exceeds specific levels.

A second form of a triple redundancy system is shown in FIGURE 2 in which redundancy of the voter device V1, V2, and V3 has been provided to correct for imperfect operation of the voter device.

In the triple redundancy system of FIGURE 2, as in the case of the triple redundancy system of FIGURE 1, the crossvoter monitors MA, MB, MC, in each case, senses the difference between one of the input signals applied at one of the input lines A1, A2, and A3 and one of the respective output lines B1, B2, and B3 leading to operated equipment G12, G22, and G32. The monitor system in each case contains three identical monitor channels MA, MB, and MC plus redundant detector logic elements which control pilot warning and action lines including two redundant detector logic elements shown in FIGURE 2 as DL1 and DL2, which control the pilot action lines while there are two redundant detector logic elements WL1 and WL2 which control the pilot warning lines.

Each channel includes a level detector LD1, LD2, and LD3, and a memory unit M1, M2, and M3 so arranged that the warning light is energized whenever a single failure occurs while the pilot action light is energized whenever two failures occur.

The foregoing is effected by sensing the difference between the input signal A and the output signal B and applying the sensed difference to the logic elements. If the signal A fails due to an open, short, or an out of tolerance condition, the level detector LD will effect a change in the state of the corresponding memory unit M. The logic of the detectors DL3 and DL4, as explained in copending U.S. application Ser. No. 318,050, filed Oct. 22, 1963, by Robert L. Worthington, and Frank J. Thomas, now U.S. Patent No. 3,289,193, and assigned to The Bendix Corporation, is such that whenever a memory unit changes state, the warning light is energized upon one failure, while the logic of the detectors DL1 and DL2 is such that the pilot action light will not be energized until there is failure in a majority of the redundant systems or in the case given in two out of three of the redundant systems.

Level detector

Figure 3:
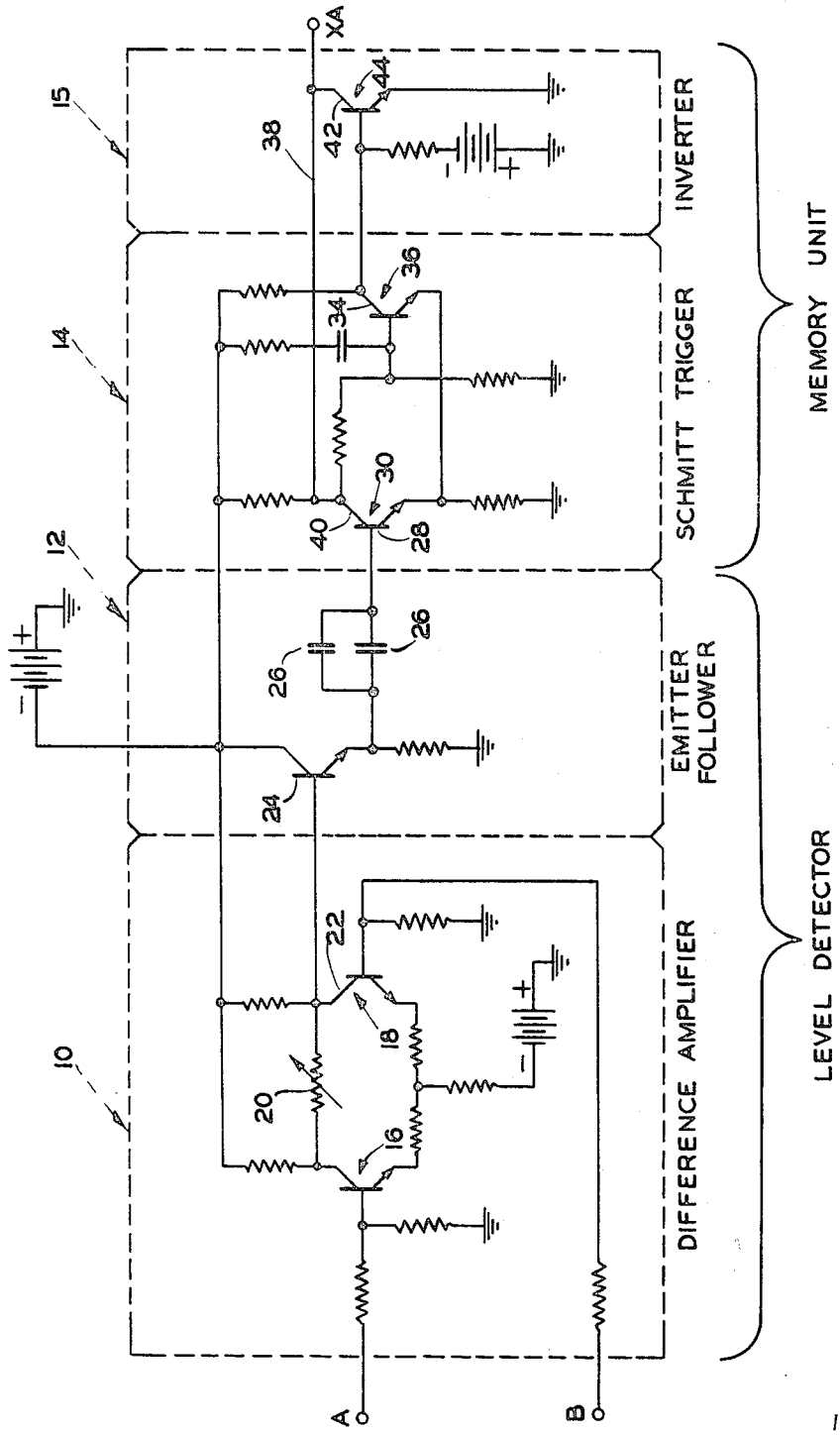
FIGURE 3 is a schematic wiring diagram of a level detector and memory circuit which may be embodied in the crossvoter monitoring system of FIGURES 1 and 2.

In implementing the aforenoted crossvoter monitor, the level detector LD embodied in the invention, as shown in FIGURE 3, may include a single ended difference amplifier 10 and an emitter follower 12, while the memory unit M includes a Schmitt trigger 14 and inverter 15. The differential amplifier 10 provides an output proportional to the difference between two input signals applied at A and B and across the voter device V of the system of FIGURE 1 or across the respective voter devices V1, V2, and V3 of the voter redundancy system of FIGURE 2.

The emitter follower 12 in the circuit of the level detector shown in FIGURE 3 provides impedance matching. Moreover whenever the output from the differential amplifier 10 in response to the difference between the input and output signals A and B applied across the voter device exceeds a predetermined voltage level, the output signal causes the Schmitt trigger 14 to fire producing a change in the state of its output.

The two signals A and B applied across the voter device V and to be compared are applied to the bases of the difference amplifier transistors 16 and 18. A variable resistor 20 is provided for adjusting the trigger level of the level detector 10. The difference amplifier 10 then provides an output for instantaneous differences in the input signals A and B thus monitoring for phase as well as amplitude.

The output obtained from the collector 22 of the transistor 18 is coupled by capacitors 26 in the follower 12 to the input of the Schmitt trigger base 28 of a transistor 30. The memory unit of the crossvoter monitor is provided by latching the Schmitt trigger 14 with an inverter 15. The input of the inverter 15 is obtained from the collector 34 of the transistor 36 of the Schmitt trigger 14 and the output line 38 of the inverter 15 is connected to the collector 40 of transistor 30. Transistor 36 is at the binary 0 level when the input of the Schmitt trigger is below the triggering point and the collector 40, transistor 30, and collector 42 of transistor 44 are at the binary 1 level.

However, when the input to the Schmitt trigger 14 is increased beyond the triggering point (as upon the difference between input and output signals A and B across the voter device exceeding a preset value determined by the adjustment of the variable resistor 20), the Schmitt trigger 14 changes state causing transistor 36 to go to the binary 1 level while transistor 30 and transistor 44 go to the binary 0 level, whereupon the signal applied through the output line X to the detector logic DL changes from a binary 1 to a binary 0 potential. Once the Schmitt trigger 14 is triggered even though the input is later reduced below the triggering point, the circuit remains in the triggering state and remains latched until it is reset. Schmitt trigger operation is such that for inputs below a predetermined level, the output is at the binary 1 level (for example +30 v. DC) and for inputs above this predetermined level, the output is at the binary 0 level (for example +1.0 v. DC).

Detector logic for warning light

Figure 4:
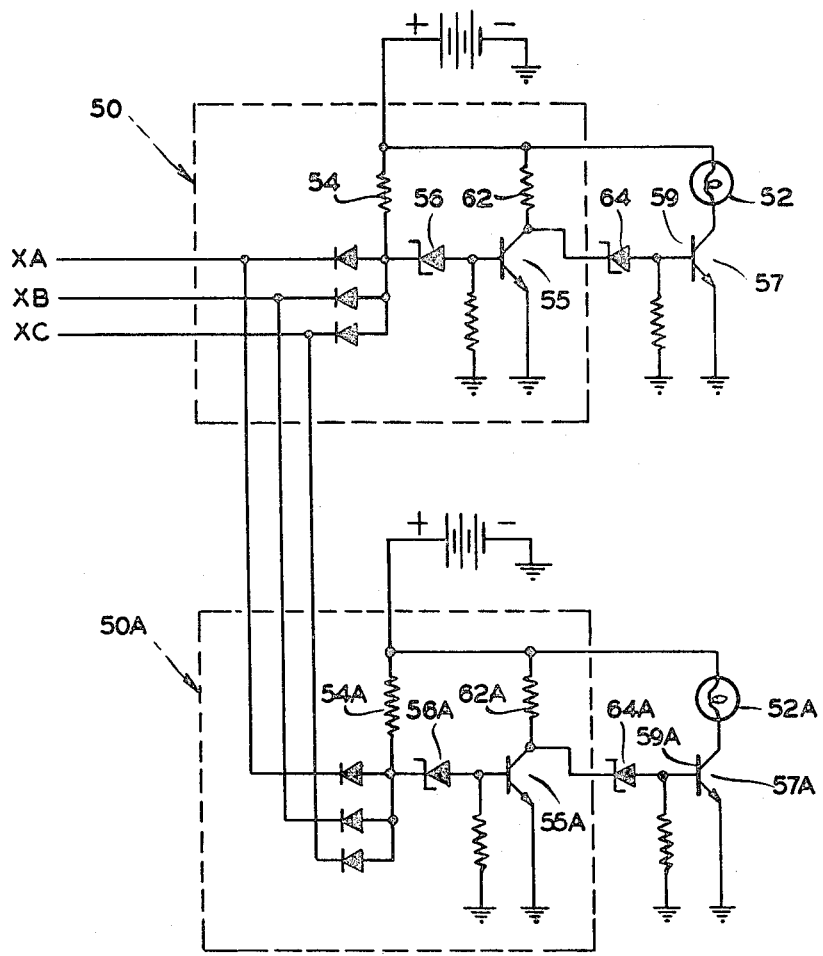
FIGURE 4 is a schematic wiring diagram of a warning light logic circuit which may be embodied in the invention.

Referring to FIGURE 4, a multiple input NAND gate 50 may be used to provide the logic control for a warning light 52 in response to input signals applied through the lines XA, XB, and XC leading from the respective level detectors and memory units MA, MB, and MC, as shown schematically in FIGURE 2.

When the input signals to the system are in tolerance, the inputs to the NAND gates 50 are at the binary 1 level in which the DC signals applied through the lines XA, XB, and XC to the respective detector logic units D1, D2, D3, and D4 have a binary 1 potential so that the transistor 55 of the NAND gate 50 is saturated through a Zener diode 56 and resistor 54.

Since transistor 55 is saturated, there is no base drive to transistor 57, therefore, the warning light 52 remains off, but when an out of tolerance signal is detected, one of the inputs XA, XB, and XC to the NAND gate 50 change to the binary 0 potential which is applied to the detector logic circuit DL3 and DL4 instead of the binary 1 potential, whereupon the transistor 55 is cut off and the drive to the base 59 of the transistor 57 is provided through resistor 62 and Zener diode 64 to turn transistor 57 on. The pilot warning light 52 is then energized through the transistor 57 from a suitable source of electrical energy or battery 58 to indicate a fault in at least one of the redundant systems.

The logic unit for pilot-action light

Figure 5:
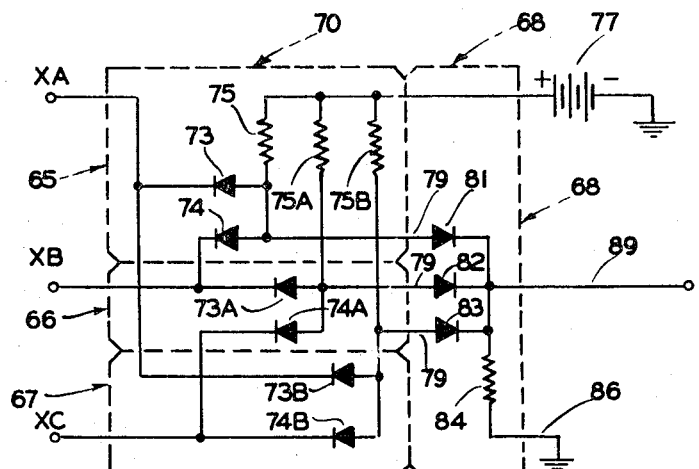
FIGURE 5 is a wiring diagram of a two-out-of-three detector or majority logic circuit which may be embodied in the crossvoter monitoring system of FIGURES 1 and 2 in operative relation between the level detector and memory circuits of FIGURE 3 and the pilot-action light driver of FIGURE 6.
Figure 6:
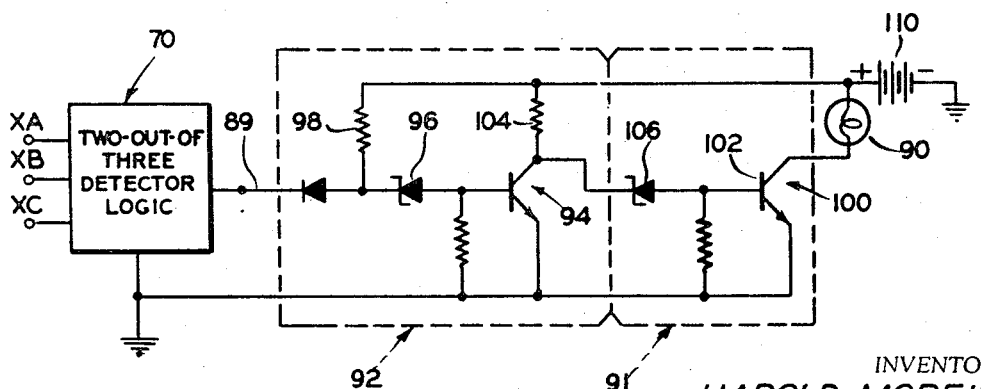
FIGURE 6 is a wiring diagram of a pilot-action light driver which may be embodied in the crossvoter monitoring system of FIGURES 1 and 2.

Referring to FIGURE 5, there is shown a combination of AND gates 65, 66, and 67 and OR gate 68 in a two out of three detector or majority logic circuit 70 for controlling the pilot-action light detector of FIGURE 6. Each of the AND gates 65, 66, and 67 are shown as of a diode logic AND gate in which AND gate 65 includes two input diodes 73 and 74 and a current limiting resistor 75 connected to a positive potential 76 of a battery 77, while in the AND gates 66 and 67, corresponding parts have been indicated by like numerals with the suffixes A and B, respectively.

The amplitude selective property of each of the AND gates 65, 66, and 67 is such that, if two signals are applied to the inputs of the diodes thereof, the respective output at 79 is equal to the most negative of the inputs.

These output lines 79, as shown in FIGURE 5, are in turn connected to the diode logic OR gate 68 including three input diodes 81, 82, and 83, and a current limiting resistor 84 connected to ground potential 86. The OR gate 80 has an output line 89.

The amplitude selection property of OR gate 68 is such that, if three signals are applied respectively to the input diodes 81, 82, and 83, the output at the line 89 would be equal to the most positive of the input signals.

In these AND and OR gates, the aforenoted properties hold true on an instantaneous basis. In the aforenoted arrangement, it will be seen then that, if a signal applied through one of the lines XA, XB, and XC has a binary 0 potential indicating a failure condition in one of the redundancy systems while the other two lines have applied thereto a signal having a binary 1 potential indicative of a nonfailure condition in the other two redundancy systems, the resultant signal at the output line 89 will be of a binary 1 potential. However, if a signal having a binary 0 potential is applied to any two of the input lines XA, XB, and XC, the detector logic of the device 70 would be such that the potential of the majority of the signals will be applied to the output line 89 so that, in the event there is applied a D.C. signal through two of the lines XA, XB, and XC having a binary 0 potential, the D.C. signal applied at the output line 89 from the majority logic circuit 70 will likewise have a binary 0 potential.

Pilot-action light driver

The effect of the binary 0 signal potential applied to the output line 89 leading to the pilot-action light driver 91 of FIGURE 6 will be to cause a pilot action light 90 to be energized. The foregoing action in the pilot-action light driver 91 of PA1 and PA2 of FIGURE 2, as shown in FIGURE 6, will be effected since the logic for the pilot-action light 90 is provided by a series combination of the OR gate 68 of the majority logic circuit 70 and an inverter 92. Initially, all inputs to the OR gate 68 are at the binary 1 level so that the transistor 94 of the inverter 92 is saturated through a Zener diode 96 and resistor 98. Since transistor 94 is saturated there is no base drive to transistor 100 controlling the pilot-action light 90, and therefore, the pilot-action light 90 remains cut off. If a single failure occurs, two of the inputs to the OR gate 68 change from a binary 1 potential to a binary 0 potential, but since the remaining input to the OR gate 68 is of a binary 1 potential, the inverter 92 remains qualified and the state of the transistors 94 and 100 thereof does not change.

However, when a second failure occurs, the remaining input to the OR gate 68 of the majority logic circuit 70 also changes to a binary 0 potential causing the inverter input 89 from the majority logic circuit 70 to change to a binary 0 potential and transistor 94 is cut off.

Thus, the drive to the transistor 94 is cut off and the drive to the base 102 of the transistor 100 is provided through resistor 104 and Zener diode 106 to turn transistor 100 on activating the pilot-action light 90 which is then energized through the transistor 100 from a source of electrical energy or battery 110 so as to indicate a failure in a majority of the redundant systems.

Operation

In the triple redundant systems to which the present invention is applicable, there is provided a passive signal selector circuit which may be called an Intermediate-Amplitude Selective Gate (IASG) or voter device circuit V in FIGURE 1 and V1, V2, and V3 in FIGURE 2.

This circuit is capable of selecting a signal having an intermediate amplitude among three or more applied signal and transmitting the selected signal exclusively and may be of a type disclosed and claimed in the copending U.S. application Ser. No. 314,397, filed Oct. 7, 1963, by Harold Moreines, now U.S. Patent No. 3,305,735.

In a sense, this may be considered to be a voting process, since the selected signal is that which is most likely to be a good one. This conclusion is arrived at by the following deductive reasoning:

(1) The signal tolerances form a set of upper and lower bounds within which a good (or true) signal must lie.

(2) A failed (or false) signal is, therefore, one which is out of the tolerance bounds.

(3) If no more than one failure has occurred, then the false signal is either the most positive extreme or the most negative extreme signal since it is outside of the tolerance band.

(4) Hence, the intermediate amplitude signal is one of the two signals within the tolerance bounds, and is, therefore, a true signal. (Under some special conditions, the failed signal may be momentarily intermediate in value. However, at these instants, it will be within the tolerance bounds and thus, by definition, acceptable as a true signal.)

In general, automatic control systems are implemented using data comprised of voltage analogs of controlled variables generated by sensor mechanisms (e.g., rate gyroscopes, accelerometers, etc.). The simplest and most natural form of the signals are amplitude-modulated suppressed-carried voltages, where the carrier may be either in the audio frequency range, such as 400 c.p.s., or DC. The IASG circuit or voter device is flexible enough to operate on these types of data, and in order to accomplish this while maintaining the essential signal waveform, it makes the signal selection on an instantaneous basis.

In practice, the triple redundant system may be implemented by having three voter devices V1, V2, and V3 located at each desired voting point in the system. They may be located at line replaceable unit (LRU) interfaces to facilitate maintenance or at other convenient points in the data processing channel.

A typical configuration is shown in FIGURE 2, where the voters are interposed between series functional elements G1 and G12, G2 and G22, and G3 and G32. In a fail-operative system, a sufficient condition for successful operation is that two or more parallel functional elements operate properly. Therefore, failure detection and monitoring must be used to ensure that no more than one parallel failure has occurred. This monitoring equipment can be completely OFF-LINE so as not to affect control system performance in the event of monitor failure. In the event of two or more parallel failures, an alarm or automatic disconnect is provided.

Again referring to FIGURE 2, voltage comparisons are made at each voter location between an input signal A and a voter output B. Should the deviation between any set of compared signals exceed a pre-set threshold, a monitor device MA, MB, and MC, for that comparator becomes effective. The outputs from the monitor devices MA, MB, and MC are applied to a diode logic circuit, shown in FIGURE 5, of the same configuration used in the voter device.

In the digital sense this diode circuit 70 is a majority logic voter and provides an alarm output should two out of the three monitor devices MA, MB, and MC become effective, indicating multiple parallel failures, and hence, a system failure. An additional requirement on the monitor is that it retain memory of a first failure. This feature is necessary to avoid erroneous indication in the event of a second identical parallel failure.

Other monitor configurations are possible having two-by-two crosschannel comparisons made between each possible pair of the three input signals, as disclosed and claimed in the copending U.S. application Ser. No. 318,050, filed Oct. 22, 1963, by Robert L. Worthington and Frank J. Thomas, now U.S. Patent No. 3,289,193.

In selecting one of the two methods, several factors warrant consideration. Crosschannel monitoring provides redundant failure data, since two comparators register each failure. Thus, in the event of a single passive monitor failure, the monitor retains its capability to indicate a subsequent system failure. The crossvoter monitor must be made internally redundant to provide this feature. Crosschannel monitoring also requires fewer leads between the monitored points and the monitor circuits.

However, the crossvoter monitor does offer an advantage in the degree of immunity to nuisance disconnects, due to system tolerance spreads. During normal operation, the tolerance spread in the crossvoter monitored differential voltage is narrower in this configuration, since each input is compared against a median voter output.

What is claimed is:

1. A monitor system comprising an input for receiving a plurality of signals:
   plural means for producing an output signal as a result of instantaneous differences in amplitude or phase of the input signal;
   plural memory means responsive to a change in said output signals;
   means responsive to a change of state of any of said memory means for indicating an out of tolerance signal; and
   further means responsive to a change of state of a majority of the memory means for indicating the presence of more than one out of tolerance signal.

2. A monitor system comprising an input for receiving a plurality of signals:
   plural means for producing an output signal as a result of instantaneous differences in amplitude or phase of the input signals;
   plural memory means responsive to a change in said output signals;
   means responsive to a change of state of a majority of the memory means for indicating the presence of more than one out of tolerance signal.

3. A monitor system comprising an input for receiving a plurality of signals:
   plural means for producing an output signal as a result of instantaneous differences in amplitude or phase of the input signals;
   plural memory means responsive to a change in said output signals,
   means responsive to a change of state of a majority of the memory means for indicating the presence of more than one out of tolerance signal;
   said change of state responsive means including an AND gate means in combination with an OR gate means.

4. A monitor system comprising an input for receiving more than two input signals:
   plural means for producing an output signal as a result of instantaneous differences in amplitude or phase of the input signals;
   means responsive to a change in any of said output signals for indicating an out of tolerance signal.

5. A monitor system for a redundant system comprising an input for receiving a plurality of signals;
   plural level detection means for producing an output signal as a result of instantaneous differences in amplitude or phase of the input signals;
   plural memory means responsive to a change in said output signals;

and redundant means responsive to a change of state in a majority of the memory means for indicating the presence of more than one out of tolerance signal.

6. A monitor system comprising an input for receiving a plurality of signals;
plural level detector means for producing an output signal as a result of instantaneous differences in amplitude or phase of the input signals;
plural memory means responsive to a change in said output signals;
redundant means responsive to a change of any of said memory means for indicating an out of tolerance signal; and
further redundant means responsive to a change of state in a majority of the memory means for indicating the presence of more than one out of tolerance signal.

7. A monitor system comprising an input for receiving more than two input signals;
plural level detector means for producing an output signal as a result of instantaneous differences in amplitude or phase of the input signals;
plural memory means responsive to a change in said output signals;
and redundant means responsive to a change of state in any of the memory means for indicating an out of tolerance signal.

8. In a redundant system, the combination comprising
a voter device for selecting from among several input signals to said device from said redundant system an intermediate amplitude output signal so as to approximate an undistorted output signal from said voter device,
plural means for sensing a difference between said output signal and each of said input signals,
plural memory means responsive to a preset difference between said output signal and each of said input signals to effect a change of state in the memory means,
means responsive to a change of state of any of said memory means for indicating an out of tolerance signal,
and further means responsive to a change of state in a majority of the memory means for indicating the presence of more than one out of tolerance signal.

9. In a redundant system, the combination comprising
a voter device for selecting from among several input signals to said device from said redundant system an intermediate amplitude output signal so as to approximate an undistorted output signal from said voter device,
plural means for sensing a difference between said output signal and each of said input signals,
plural memory means responsive to a preset difference between said output signal and each of said input signals to effect a change of state in the memory means,
and means responsive to a change of state in a majority of the memory means for indicating the presence of more than one out of tolerance signal.

10. The combination defined by claim 9 wherein the means responsive to a change of state in a majority of the memory means for indicating the presence of more than one out of tolerance signal includes a majority logic gate means.

11. The combination defined by claim 10 in which said majority logic gate means includes a combination of AND and OR gate means.

12. In a redundant system, the combination comprising
a voter device for selecting from among several input signals to said device from said redundant system an intermediate amplitude output signal so as to approximate an undistorted output signal from said voter device;
plural means for sensing a difference between said output signal and each of said input signals to effect a change of state thereof;
and means responsive to a change of state of any one of said difference sensing means for indicating an out of tolerance signal.

13. In triple redundant electrical systems, the combination comprising
a voter device for each redundant system for selecting from input signals supplied by the triple redundant systems an intermediate amplitude output signal so as to approximate an undistorted output signal from each of said voter devices,
plural level detector means for sensing a difference between said output signal and each of said input signals supplied by said triple redundant systems,
plural memory means responsive to a preset difference between said output signal and each of said input signals to effect a change of state in the memory means,
means responsive ot a change of state of any of said memory means for indicating an out of tolerance signal from at least one of said redundant systems,
and additional means responsive to a change of state in a majority of the memory means for indicating the presence of out of tolerance signals from more than one of said redundant systems.

14. In triple redundant electrical systems, the combination comprising
a voter device for each redundant system for selecting from input signals supplied by the triple redundant systems an intermediate amplitude output signal so as to approximate an undistorted output signal from each of said voter devices,
plural level detector means for sensing a difference between said output signal and each of said input signals supplied by said triple redundant systems,
plural memory means responsive to a preset difference between said output signal and each of said input signals to effect a change of state in the memory means,
and additional means responsive to a change of state in a majority of the memory means for indicating the presence of out of tolerance signals from more than one of said redundant systems.

15. In triple redundant electrical systems, the combination comprising
a voter device for each redundant system for selecting from input signals supplied by the triple redundant systems an intermediate amplitude output signal so as to approximate an undistorted output signal from each of said voter devices,
plural level detector means for sensing a difference between said output signal and each of said input signals supplied by said triple redundant systems,
plural memory means responsive to a preset difference between said output signal and each of said input signals to effect a change of state in the memory means,
and means responsive to a change of state of any of said memory means for indicating an out of tolerance signal from at least one of said redundant systems.

References Cited
UNITED STATES PATENTS 3,289,193   11/1966   Worthington et al. _ _ _ _ 340—248

DONALD J. YUSKO, Primary Examiner

U.S. Cl. X.R.
307—211; 340—147